United States Patent [19]

Thomas, Sr.

[11] Patent Number: 4,741,896
[45] Date of Patent: May 3, 1988

[54] LIME PROCESSING APPARATUS

[76] Inventor: Robert L. Thomas, Sr., 1909 Wood La., Forth Worth, Tex. 76117

[21] Appl. No.: 2,459

[22] Filed: Jan. 12, 1987

Related U.S. Application Data

[63] Continuation of Ser. No. 647,052, Sep. 4, 1984, abandoned.

[51] Int. Cl.⁴ .............................................. E02D 3/14
[52] U.S. Cl. ...................................... 423/640; 422/162
[58] Field of Search ...................... 422/162, 209, 229; 423/640

[56] References Cited

U.S. PATENT DOCUMENTS

| | | | |
|---|---|---|---|
| 664,440 | 12/1900 | Schulthess | 422/162 |
| 773,029 | 10/1904 | Reaney | 422/162 |
| 1,157,284 | 10/1915 | Auram | 422/162 |
| 1,204,700 | 11/1916 | Schofield | 422/162 |
| 1,350,534 | 8/1920 | Weber | 422/162 |
| 1,849,462 | 2/1931 | Kuntz | 422/162 |
| 1,877,010 | 12/1932 | Miscampbell | 422/162 |
| 2,261,390 | 11/1941 | Kite et al. | 422/162 |
| 2,559,691 | 7/1951 | Walker | 422/162 |
| 2,560,316 | 7/1951 | Walker | 422/162 |
| 2,904,401 | 9/1959 | Booth | 422/162 |
| 3,066,016 | 11/1962 | Mckinley et al. | 422/162 |
| 3,538,067 | 11/1970 | Bognar | 422/137 |
| 3,726,648 | 4/1973 | Weber et al. | 422/137 |
| 4,154,798 | 5/1979 | Bittner | 422/162 |
| 4,233,015 | 11/1980 | Teague et al. | 105/263 |
| 4,261,953 | 4/1981 | Gisler | 422/162 |
| 4,329,090 | 5/1982 | Teague et al. | 405/263 |
| 4,511,535 | 4/1985 | Schmidt et al. | 422/137 |

FOREIGN PATENT DOCUMENTS 1140502 11/1962 Fed. Rep. of Germany ............ 162/

Primary Examiner—Barry S. Richman
Assistant Examiner—William R. Johnson
Attorney, Agent, or Firm—James E. Bradley

[57] ABSTRACT

A lime processing apparatus has a transportable base and a reaction vessel mounted on the base. The reaction vessel has an inlet end for receiving a pressurized flow of water and lime and has a discharge end. A mechanical agitator is rotatably mounted within the vessel interior for mixing the water and the lime within the vessel to form a slurry product and to move the slurry product through the vessel to continuously discharge product from the discharge end. An elevator mechanism on the transportable base elevates the discharge end of the reaction vessel whereby any unreacted solids in the slurry product are collected at the inlet end for removal through a solids discharge conduit.

3 Claims, 3 Drawing Sheets

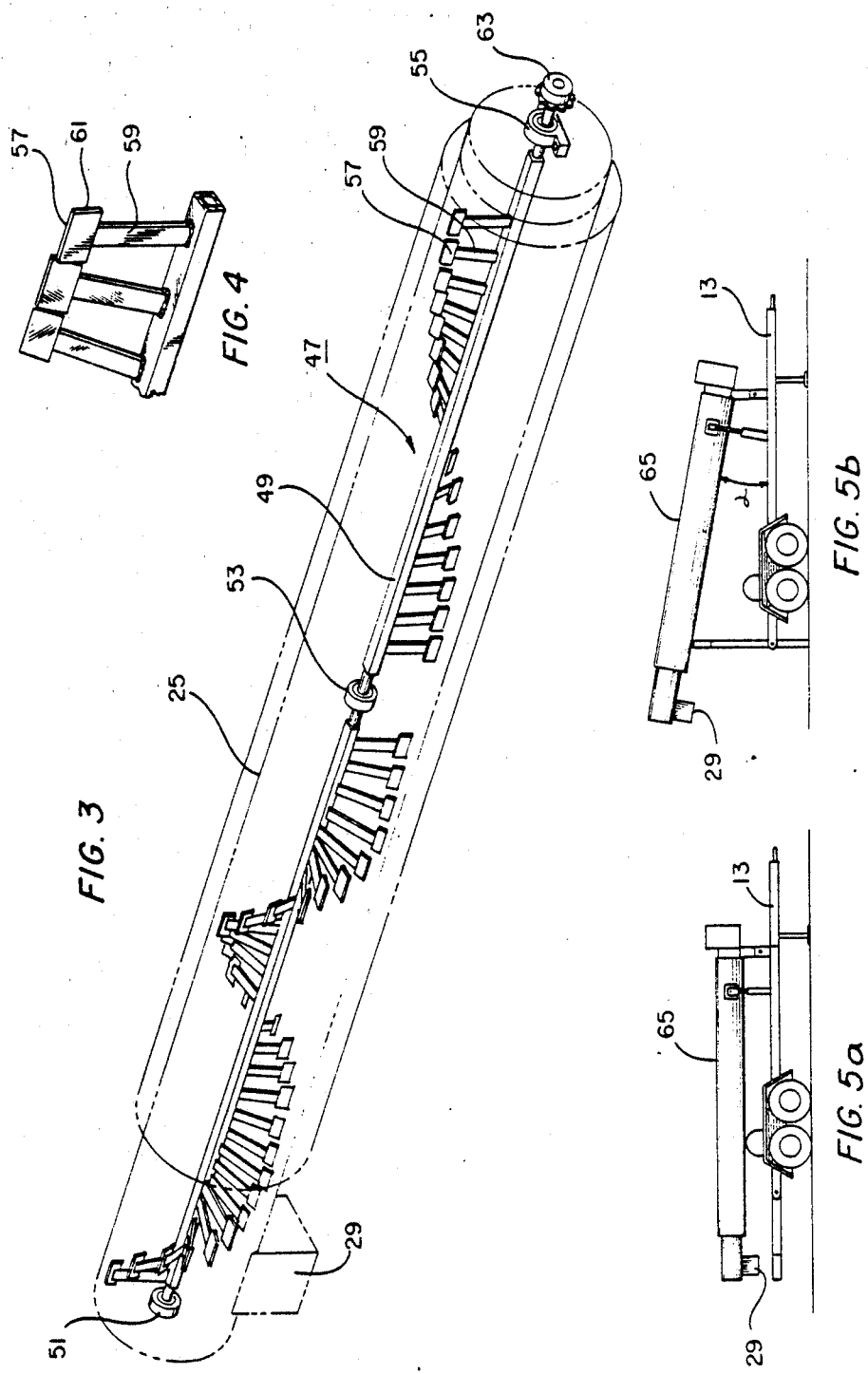

LIME PROCESSING APPARATUS

This is a continuation of application Ser. No. 647,052, filed Sept. 4, 1984, now abandoned.

BACKGROUND OF THE INVENTION

Field of the Invention

The present invention relates to devices used for hydrating and slaking lime to produce hydrated lime such as is used in soil stabilization projects.

The conversion of unhydrated quick lime, CaO, to lime hydrate, $Ca(OH)_2$, is referred to as "hydration" or "slaking", depending upon the amount of excess water utilized in the process. Often in the art "slaking" is used to refer to a process utilizing a relatively large amount of water to produce a product slurry, whereas "hydration" describes a process wherein only sufficient water is used; however, for the purposes of this disclosure, the terms "hydration" and "slaking" are used interchangeably.

At the present time, hydrated lime is used in various soil stabilization applications, such as highway road bed stabilization. In a typical application, one or more large mixing tanks, i.e., 24,000 gallons capacity, are hauled to the job site on trucks. Usually at least two mixing tanks are hauled to the job site and connected to an available water source, such as a fire hydrant. The separate mixing tanks are connected by separate lines to a common holding tank. One or more discharge lines from the holding tank are used to fill slurry trucks which then haul the hydrated lime to the work area and spread the lime.

Where separate, batch mixing tanks are used, each tank must first be supplied with 6 to 8 feet of water or approximately ¾ full, which can take one to one and one half hours in the case of a 24,000 gallon tank. As one of the tanks begins to fill with water, quick lime is delivered to the job site in trucks and added to one of the tanks. A stirrer in the mixing tank agitates the lime and water mixture and a heat of hydration is given off which ultimately raises the water temperature to about 140 degrees F. In attempting to control the reaction, four to five tons of quick lime are typically added to a single mixing tank and agitated. Once the water temperature reaches 140–160 degrees F. the remainder of the quick lime is added to the mixing tank. Once the hydration reaction has run its course, the slurry is passed through a discharge line into the holding tank and from the holding tank into waiting slurry trucks. While the reaction is occurring in one mixing tank, another operator refills the second mixing tank with fresh water. By staggering the refilling operation and the hydration reaction steps between two mixing tanks, some time is saved in getting the lime slurry to the slurry trucks.

Existing lime hydration systems for soil stabilization projects suffer from a number of disadvantages. The use of multiple, large capacity tanks is very expensive. If a water line is not available as the source of fresh water, water must also be hauled to the job site. Even by using a plurality of mixing tanks and alternately switching between tanks, it is extremely difficult to continuously supply slurry to the waiting slurry trucks. It is not possible to spread and leave hydrated lime exposed to the atmosphere for more than about 24 hours without oxidation of the lime particles occurring and resulting wasted product. Since it is difficult to continuously supply slurry with existing systems, it is often necessary to prepare a sufficient quantity of slurry beforehand and store the slurry overnight in storage tanks.

There exists a need, therefore, for a lime hydrating device of the type used to supply hydrated lime in soil stabilization projects which can be operated to continuously produce a slurry product without intermittant delays.

There exists a need for such a device which is mobile and can be easily transported from one job site to another.

There exists a need for such a device which utilizes the heat given off by the hydration reaction to more completely effect the complete conversion of the quick lime entering the device into hydrated lime.

The above objects are accomplished in the device of the invention, as will be described.

SUMMARY OF THE INVENTION

The lime processing apparatus of the invention has a transportable base with a reaction vessel mounted on the base. The reaction vessel has an inlet end for receiving a pressurized flow of water and lime and has a discharge end. A mechanical agitator is located within the reaction vessel for mixing the water and lime within the vessel to form a slurry product and for moving the slurry product through the reaction vessel to continuously discharge product from the discharge end.

An elevation mechanism on the transportable base elevates the discharge end of the reaction vessel, whereby any unreacted solids in the slurry product are collected at the inlet end of the reaction vessel. A solids discharge located at the inlet end is provided for periodically removing accumulated solids. Preferably, the mechanical agitator is a rotatable shaft which has a plurality of discrete projections which are arranged in a spiral pattern with respect to the longitudinal axis of the shaft.

The reaction vessel is preferably a concentric tube heat exchanger which has an inner tube comprising the reaction vessel and an outer jacket surrounding the inner tube. The inner tube of the heat exchanger has a cold water inlet for circulating water through the jacket and a hot water outlet. Water circulated through the heat exchanger jacket is heated by the heat of hydration which is given off within the inner tube. The water so heated is passed out the hot water outlet from the jacket and is connected to a source of pressurized lime entering the heat exchanger inner tube. In this way, the inlet water used to form a slurry product within the inner tube is preheated by first passing through the surrounding outer jacket.

Additional objects, features and advantages will be apparent in the written description which follows.

BRIEF DESCRIPTION OF THE DRAWINGS

FIG. 3 is a view of the mechanical agitator of the invention, with the surrounding reaction vessel shown in dotted lines.

FIG. 4 is an isolated view of a portion of the agitator shaft.

FIG. 5a is a simplified side view of the apparatus of the invention in the transport position.

FIG. 5b is a view similar to FIG. 5a, but showing the apparatus in the elevated processing position.

DETAILED DESCRIPTION OF THE INVENTION

Figure 1:
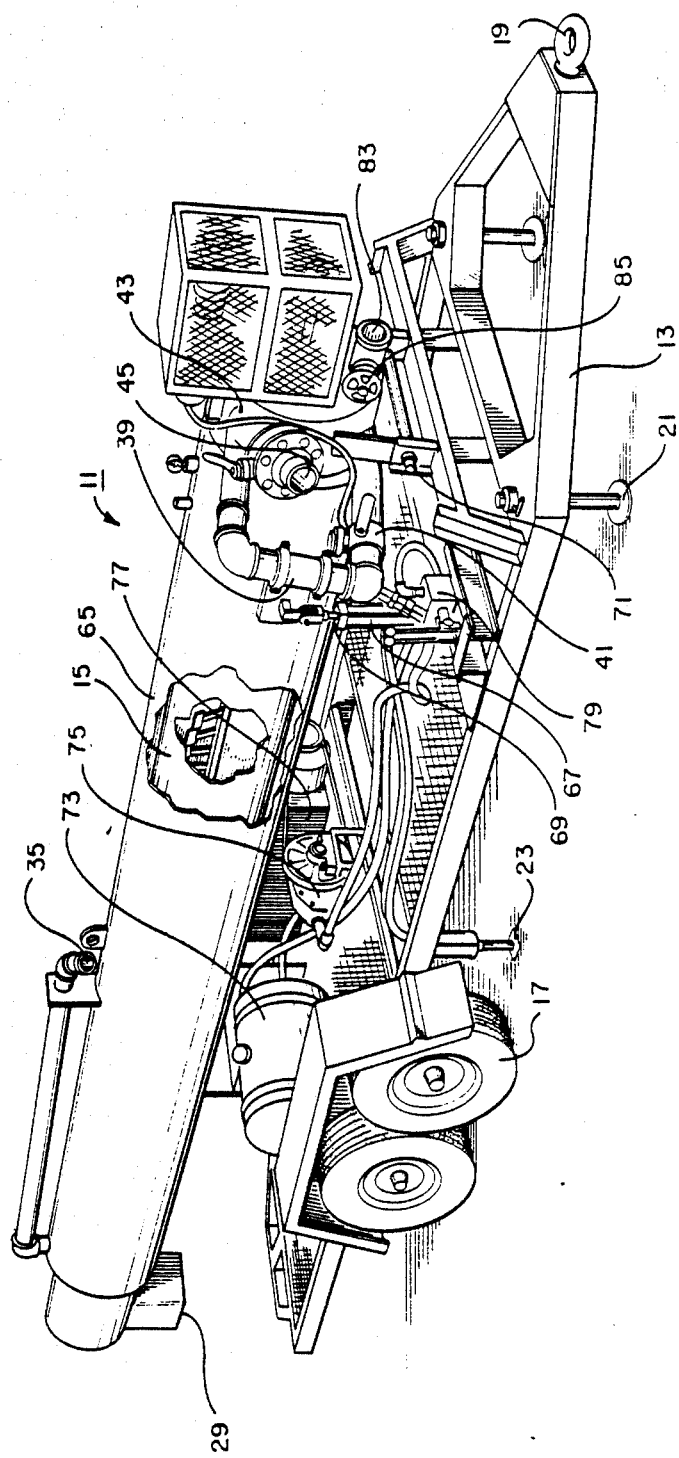
FIG. 1 is a perspective view of the lime processing apparatus of the invention showing the reaction vessel in the transport position.

FIG. 1 shows a lime processing apparatus of the invention designated generally as 11. The apparatus includes a transportable base or trailer 13 upon which a reaction vessel 15 is mounted. The transportable base 13 is a flat bed trailer having wheel axles and wheels 17 and a hitch 19 for pulling the trailer over the road. Struts and outriggers 21, 23 respectively are provided for positioning the trailer at rest.

Figure 2:
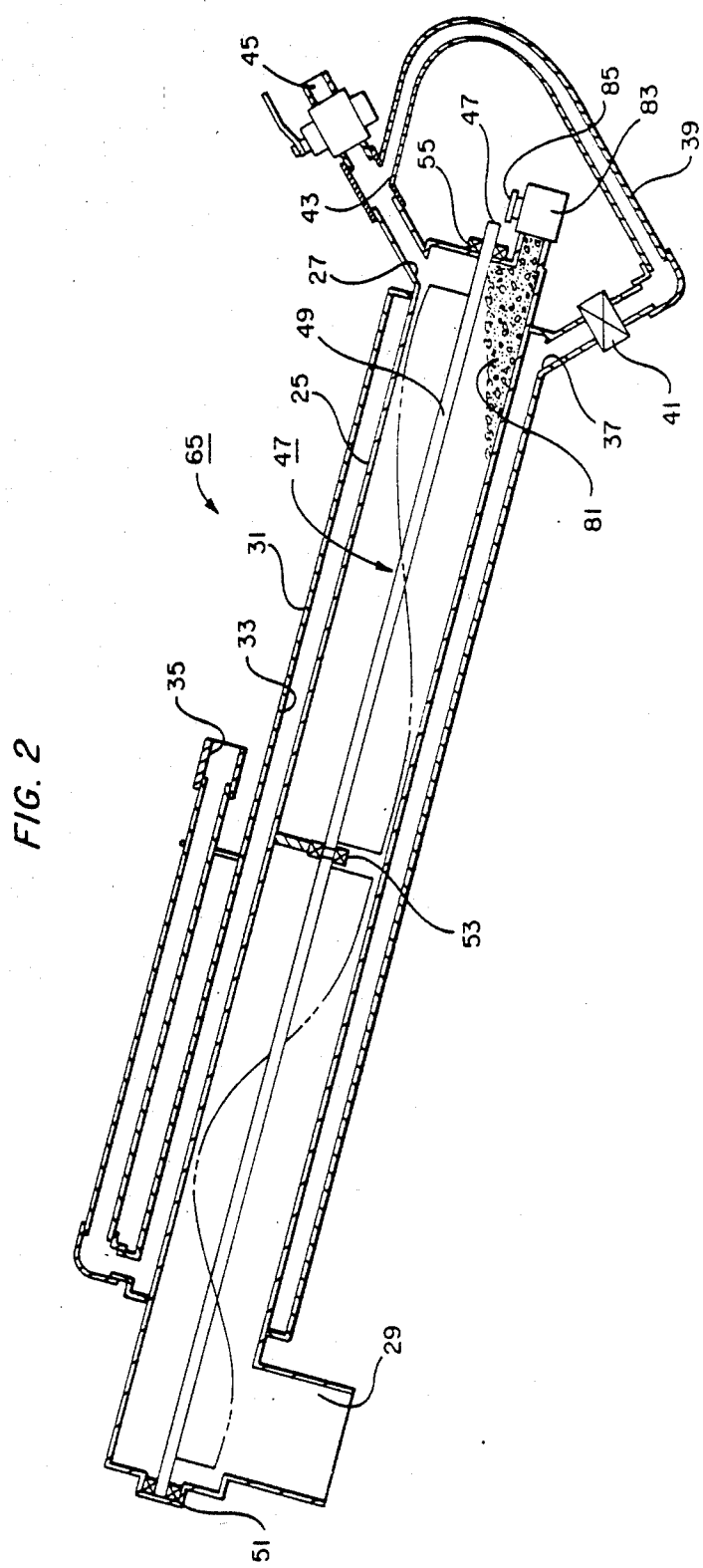
FIG. 2 is a schematic, cross-sectional view of the reaction vessel of the invention.

The reaction vessel is shown in greater detail in FIG. 2. As shown in FIG. 2, a concentric tube heat exchanger is provided for mounting on the transportable base. The heat exchanger has an inner cylindrical tube 25 which comprises a reaction vessel with an inlet 27 for receiving a pressurized flow of water and lime and a discharge outlet or chute 29. Inner tube 25 is preferably formed from 5/16 inch seamless steel and is approximately 20 inches in diameter and 24 feet in length. The inner tube has the capacity to hold approximately 5692 lbs of water and lime. The cylindrical inner tube 25 is surrounded by an outer jacket 31 which creates an annular space 33 along the majority of the length of the inner tube 25 for the circulation of water. Outer jacket 31 is approximately 24 inches in diameter.

A cold water inlet such as hose 35 is provided for connection to a source of available water, such as a city water line, fire hydrant, or the like. Alternatively, water from a nearby lake or other available source could be pumped through the cold water inlet 35. Cold water entering the inlet 35 passes through the annular space 33 about the inner tube 25 and passes out a hot water outlet 37 at the inlet end of the inner tube 25. Hot water passing through the outlet 37 is routed through a connecting conduit 39 and a flow control valve 41 to a junction 43 with a conduit 45 carrying a source of pressurized lime. The conduit 45 would typically lead from a pneumatic pump truck which would be blowing dry quick lime into the inlet 27 of the inner tube 25. As shown in FIG. 2, the connecting conduit 39 is exterior to the inner tube 25 and meets the lime conduit 45 at a Y-shaped junction 43, whereby the preheated water is "jetted" into the incoming flow of dry quick lime. The diameter of the connecting conduit is slightly smaller than the diameter of the conduit 45 at the junction 43.

The incoming stream of quick lime and preheated water which enters the inlet 27 is agitated by a mechanical agitator 47. The agitator 47 comprises a rotatable shaft 49 which is mounted by bearing arrangements 51, 53, and 55 within the inner tube 25 and includes a plurality of discrete projections mounted thereon.

As shown in FIG. 3, the projections 57 include shaft portions 59 which extend outwardly from the axis of the shaft 49 and which are arranged in a spiral pattern with respect to the longitudinal axis of the shaft 49. Preferably, the projections 57, as shown in FIG. 4, include paddles 61 formed at the outer extents thereof. As best seen in FIG. 3, the number of paddles arranged in the spiral pattern increases in the direction of the discharge outlet 29 from the inner tube 25. In the preferred embodiment shown, the rotatable shaft 49 is approximately 24 feet long and is divided by bearing 53 into two equal twelve foot lengths. The paddles at the inlet end of the inner tube 25 spiral approximately one half turn about the longitudinal axis of the shaft 49. The paddles located on the shaft side above the bearing 53 spiral approximately one and one half to two complete turns about the longitudinal axis of the shaft 49. A sprocket 63 is provided adjacent bearing 55 and is adapted to be driven by a suitable gear box and motor to rotate the agitator 47.

As shown in FIGS. 1 and 5a-5b, the concentric tube heat exchanger 65 is pivotally mounted on the transportable base 13. As best shown in FIGS. 5a and 5b, the heat exchanger 55 is pivotally between a transport position (FIG. 5a) in a horizonal plane and a processing position (FIG. 5b) in which the discharge end of the heat exchanger is inclined with respect to the horizonal plane. The angle alpha in FIG. 5b is preferably about 35 degrees with respect to the plane of the base 13.

As shown in FIG. 1, the elevating means for the heat exchanger 65 can comprise a pair of hydraulic cylinders 67 mounted on opposite sides of the heat exchanger 65 having output shafts 69 which are extendable by hydraulic pressure to pivot the heat exchanger about a pivot axle 71, whereby the discharge outlet 29 is inclined upwardly. Hydraulic fluid can be supplied to the cylinder 67 from any convenient source, such as from the tank 73 and hydraulic pump 75. The pump 75 is driven, in the embodiment shown, by a gasoline powered engine 77 mounted on the transportable base 13. A set of controls 79 are provided for adjusting the elevation of the discharge end 29 of the heat exchanger 65.

With reference to FIG. 2, the operation of the lime processing apparatus will now be described. The apparatus is first hauled to the work site on the transportable base 13 and the struts 21 and outriggers 23 are positioned at the proper height. A supply of fresh water from a suitable source is connected to the cold water inlet 35 and the lime conduit 45 is connected to a source of pressurized dry quick lime, such as a pneumatic blower of the type known in the industry. Fresh water is circulated through the inlet 35 into jacket 31 and passes out the hot water outlet 37. Water passing through the connecting conduit 39 is jetted into the incoming flow of quick lime passing through conduit 45 and enters the inlet and 27 of the inner tube 25. The mechanical agitator 47 mixes the water and lime within the vessel to form a slurry product and moves the slurry product through the vessel to continuously discharge product from the discharge chute 29 into a waiting slurry truck.

As the water and lime are mixed within the inner tube 25, a heat of reaction is produced which raises the temperature of the slurry to about 180-210 degrees F. The heat produced in the inner tube 25 is transferred to the water circulating through the annular space 33, which pre-heats the water passing through conduit 39 to the junction 43.

Because the discharge end of the heat exchanger 65 is inclined at a 35 degree angle with respect to the base, and because of the paddle arrangement and spacing, any unreacted or difficult to react solids 81 accumulate at the inlet end 27 of the inner tube 25. Because the solids 81 are allowed to accumulate and further react than being forced out the discharge end, most are ultimately hydrated and passed out the system in the slurry exiting the discharge chute 29. However, a solids discharge 83 is provided with a suitable valve 85 to periodically remove any collected solids from the reaction vessel. For instance, when one slurry truck has been filled, the pneumatic blower could be shut off, the inlet water would be shut off, and the valve 85 opened to allow the solids removal. Since the discharge end 29 of the inner tube 25 is open at all times, there are no dangerous pressures which build up within the reaction vessel.

An invention has been provided with several advantages. The lime processor of the invention provides a better slaking action than a batch tank. Because quick lime generate its heat of hydration immediately, a portion of the quick lime is "drowned" in a batch operation with the hard to slake particles settling to the bottom of the tank. The continuous flow operation of the applicant's invention produces a more complete reaction and a purer slurry product. Because of the temperature generated and the continuous nature of applicant's method, approximately 90% of the quick lime entering the inlet 27 is hydrated within 15 seconds. The slurry remains within the inner tube 25 for approximately 1 minute 20 seconds, however, which further reduces impurities at the discharge.

Applicant's continuous process does not require a long waiting time for the water to heat up as does a batch tank. Also, there is no shut down time required in applicant's method of operation since it is not necessary to stop and fill a large capacity tank. The outer jacket of applicant's device provides preheated inlet water which provides a more complete reaction with the entering quick lime.

The inner tube of applicant's device is made of 5/16 inch seamless steel which is rated to at least 12,000 PSI as an added safety factor. Because the discharge chute remains open at all times, there is no possibility of a blow out as sometimes occurs with batch tanks when too violent reaction occurs. The outer jacket also serves as an insulator and prevents the possibility of operator injury through inadvertent contact with the hot steel of the inner tube in which the reaction is occurring.

While the invention has been shown in only one of its forms, it is not thus limited but is susceptible to various changes and modifications without departing from the spirit thereof.

I claim:

1. A method of creating a slurry of water and a powder material, comprising the steps of:
   providing a mixing vessel with an inlet end on one end and a discharge end on the opposite end;
   mounting in the vessel a rotatable agitator;
   mounting a mixing tube to the inlet end of the vessel and providing the mixing tube with two inlets;
   blowing the powder material while dry into one of the inlets of the mixing tube;
   injecting a pressurized flow of the water into the other inlet of the mixing tube, causing the powder material and the water to mix in the mixing tube and enter the vessel as a slurry;
   elevating the discharge end of the vessel relative to the inlet end to create a hydrostatic head in the slurry at the inlet end that is greater than at the discharge end;
   rotating the agitator to further mix the slurry in the vessel, and continuously flowing the slurry out the discharge end.

2. A method of creating a slurry of water and a powder material, comprising the steps of:
   mounting a cylindrical mixing vessel on a transportable base;
   providing the mixing vessel with an inlet end on one end and an open discharge end on the opposite end;
   mounting an elevating means to the vessel and the base for selectively moving the discharge end of the vessel from a lower transporting position relative to the base to an operating position relative to the base, the discharge end being higher than the inlet end when the vessel is in the operating position;
   mounting in the vessel a rotatable agitator extending from one end to the other end;
   mounting a mixing tube to the inlet end of the vessel, and providing the mixing tube with two inlets;
   rotating the agitator;
   continuously blowing the powder material while dry into one of the inlets of the mixing tube;
   continuously injecting a pressurized flow of the water into the other inlet of the mixing tube, causing the powder material and the water to mix in the mixing tube and enter the vessel as a slurry;
   elevating the discharge end of the vessel with the elevating means from the transporting position to the operating position, creating a hydrostaic head in the slurry in the vessel that is greater at the inlet end than the discharge end; and
   continuously flowing the slurry out the discharge end.

3. A method of creating a slurry of water in a powder material, comprising the steps of:
   providing a mixing vessel on a transportable base;
   providing the mixing vessel with an inlet end on one end and an open discharge end at the opposite end;
   mounting in the vessel a rotatable agitator extending from one end to the other end;
   mounting a mixing tube to the inlet end of the vessel, and providing the mixing tube with a powder material inlet and a water inlet, and joining the water inlet to the powder material inlet at an actue angle;
   rotating the agitator;
   continuously blowing the powder material under pressure and while dry into the powder material inlet of the mixing tube;
   continuously injecting a pressurized flow of the water into the water inlet of the mixing tube to flow into the stream of powder material being injected and mix into a slurry prior to entry into the vessel;
   elevating the discharge end of the vessel relative to the inlet end to create a hydrastatic head in the slurry in the vessel at the inlet end that is greater than at the discharge end, and continuously flowing the slurry out the discharge end.

* * * * *